United States Patent
Yang et al.

(10) Patent No.: US 10,481,342 B1
(45) Date of Patent: Nov. 19, 2019

(54) DUST PROTECTOR WITH CLEANING FUNCTION FOR FIBER OPTIC CONNECTOR

(71) Applicant: PROTAI PHOTONIC CO., LTD, New Taipei (TW)

(72) Inventors: Jyh-Cherng Yang, Taipei (TW); Yu-Kai Chen, Taipei (TW)

(73) Assignee: PROTAI PHOTONIC CO., LTD, New Taipei (TW)

( * ) Notice: Subject to any disclaimer, the term of this patent is extended or adjusted under 35 U.S.C. 154(b) by 0 days.

(21) Appl. No.: 16/178,028

(22) Filed: Nov. 1, 2018

Related U.S. Application Data

(60) Provisional application No. 62/670,988, filed on May 14, 2018.

Foreign Application Priority Data

Sep. 10, 2018 (TW) .............................. 107131748 A

(51) Int. Cl.
  *G02B 6/38* (2006.01)
(52) U.S. Cl.
  CPC ......... *G02B 6/3849* (2013.01); *G02B 6/3866* (2013.01)
(58) Field of Classification Search
  CPC .. G02B 6/3849; G02B 6/3866; B08B 2240/02
  USPC ................................................ 385/139, 147
  See application file for complete search history.

(56) References Cited

U.S. PATENT DOCUMENTS

| | | | | |
|---|---|---|---|---|
| 7,340,146 B2* | 3/2008 | Lampert | .............. | G02B 6/3849 385/134 |
| 7,899,300 B2* | 3/2011 | Wakileh | ............... | G02B 6/3849 385/139 |
| 8,041,177 B2* | 10/2011 | Zimmel | ............... | G02B 6/3849 385/134 |
| 8,939,655 B2* | 1/2015 | Burkett | ................ | G02B 6/3849 385/73 |
| 9,086,554 B2* | 7/2015 | Scea | ..................... | G02B 6/3849 |
| 9,312,624 B2* | 4/2016 | Borden | .................. | H01R 13/44 |
| 2005/0220434 A1* | 10/2005 | Hsieh | .................. | G02B 6/3849 385/134 |
| 2005/0286853 A1* | 12/2005 | Fujiwara | ................... | B08B 1/00 385/134 |

(Continued)

FOREIGN PATENT DOCUMENTS

WO   WO 2017/058629 A1 *  4/2017  ............... G02B 6/42

*Primary Examiner* — Robert Tavlykaev
(74) *Attorney, Agent, or Firm* — WPAT, PC

(57) ABSTRACT

A dust protector of a fiber optic connector according to the present disclosure includes a dust cap and a cleaning component. The dust cap includes a frame and a cover. The frame is configured to cover the front end of a fiber optic connector. The cover is pivotally coupled to the frame. The cleaning component is disposed on the frame to clean the fiber optic connector. The cover is configured to be closed to cover the cleaning component and to be flipped open to expose the cleaning component. The present disclosure further provides another dust protector of a fiber optic connector. In addition to being used to protect the fiber optic connector from contamination, the dust protector of the present disclosure provides additional value that avoids the need to use a separate component to clean a fiber end of a fiber optic connector.

18 Claims, 23 Drawing Sheets

(56) References Cited

U.S. PATENT DOCUMENTS

| | | | | |
|---|---|---|---|---|
| 2007/0217749 A1* | 9/2007 | Jong | G02B 6/3849 |
| | | | 385/88 |
| 2013/0260582 A1* | 10/2013 | White | H01R 13/453 |
| | | | 439/149 |
| 2016/0349459 A1* | 12/2016 | Collier | G02B 6/3849 |
| 2016/0349460 A1* | 12/2016 | Collier | G02B 6/3849 |
| 2017/0254963 A1* | 9/2017 | Sparrowhawk | G02B 6/3849 |
| 2018/0267252 A1* | 9/2018 | Takano | G02B 6/3866 |
| 2018/0267265 A1* | 9/2018 | Zhang | G02B 6/3825 |

* cited by examiner

DUST PROTECTOR WITH CLEANING FUNCTION FOR FIBER OPTIC CONNECTOR

RELATED APPLICATION

The present application claims priority to U.S. Provisional Application Ser. No. 62/670,988, filed on May 14, 2018, and to Taiwanese Application Number 107131748, filed on Sep. 10, 2018, the disclosures of which are hereby incorporated by reference herein in their entirety.

BACKGROUND

1 Technical Field

The disclosure relates to a dust protector of a fiber optic connector, and more particularly, to a dust protector with cleaning function for a fiber optic connector.

2. Description of the Related Art

Optical fibers have revolutionized communication throughout the world. With the increased use of optical fibers it has become increasingly important to be able to connect and disconnect optical fiber cables from various sources. Fiber optic connectors may be used where a connect/disconnect capability is required in an optical communication system. Fiber optic connectors may be used to, for example, connect any kind of optical equipment such as waveguides (e.g., optical fibers), or optical transceivers. For example, a fiber optic connector may be used to interconnect optical fibers, or to connect an optical fiber to an optical transceiver. Fiber optic connectors may be designed for temporary interconnection of optical equipment. However, existence of dirt, including dust particles, contaminants or similar, on the connection faces of the fiber optic connectors may partially occlude the light going from one optical fiber to another, significantly reducing connection bandwidth.

The dust protector of a fiber optic connector is provided to protect the fiber optic connector from contamination. However, most of the dust protectors of the existing fiber optic connectors do not have cleaning function. When a fiber optic connector is to be cleaned after the dust protector is removed, it is necessary to use a separate cleaning component to clean the fiber end of the connector.

SUMMARY

In order to solve the problem that the dust protector does not provide a function to clean a fiber optic connector, the present disclosure provides a dust protector of a fiber optic connector including a dust cap and a cleaning component. The dust cap includes a frame and a cover. The frame is configured to cover the front end of a fiber optic connector. The cover is coupled to the frame. The cleaning component is disposed on the frame to clean the fiber optic connector. The cover is configured to be closed to cover the cleaning component and to be flipped open to expose the cleaning component.

The dust protector of the present disclosure further includes a cylinder and a retaining ring. The cylinder is coupled to the frame and the cleaning component covers the front end of the cylinder. The retaining ring secures the cleaning component to the cylinder.

In the dust protector of the present disclosure, a recess is formed on each of two opposing sides of the cylinder to accommodate a guide pin disposed on the fiber optic connector.

The dust protector of the present disclosure further includes a first engaging portion and a second engaging portion. The first engaging portion is coupled to the frame. The second engaging portion is coupled to the cover and is configured to engage with the first engaging portion to prevent the cover from being flipped open.

In the dust protector of the present disclosure, the dust cap further includes a fixing portion disposed on the frame. When the frame covers the front end of the fiber optic connector, the fixing portion may abut against the protrusions formed on the latch of the fiber optic connector to prevent the fiber optic connector from being pulled out from the frame.

In the dust protector of the present disclosure, the cleaning component is a cleaning wipe or an adhesive cloth.

In the dust protector of the present disclosure, the cleaning component is a jelly adhesive. The dust cap further includes a trough coupled to the frame to accommodate the jelly adhesive In the dust protector of the present disclosure, the dust cap is integrally formed.

In the dust protector of the present disclosure, the frame is configured to cover an LC type or MPO type fiber optic connector.

The present disclosure further provides another dust protector of a fiber optic connector. The dust protector of present disclosure includes a dust cap and a cleaning component. The dust cap includes a frame and two covers. The frame is configured to cover the front end of a fiber optic connector. The two covers are coupled to the frame. The cleaning component is disposed on the frame to clean the fiber optic connector. The two covers are configured to be coupled together to cover the cleaning component and to be flipped open to expose the cleaning component.

In addition to being used to protect fiber optic connectors from contamination, the dust protectors of the present disclosure provide additional value that avoids the need to use a separate cleaning component to clean a fiber end.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
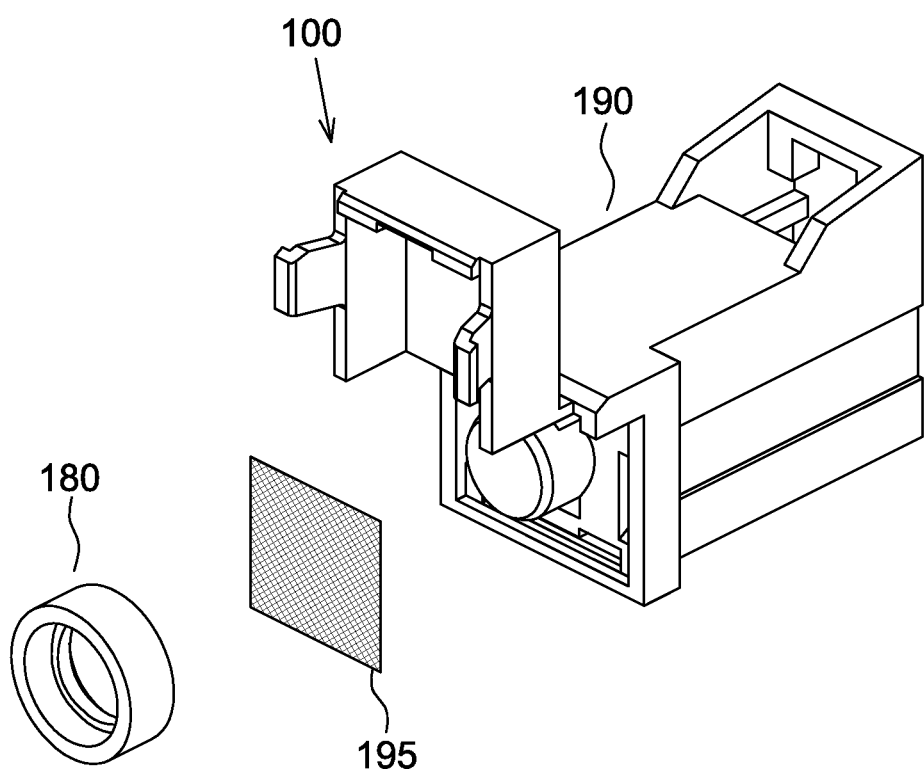
FIG. 1 is an exploded view of the dust protector of a fiber optic connector of the first embodiment of the present disclosure.
Figure 2A:
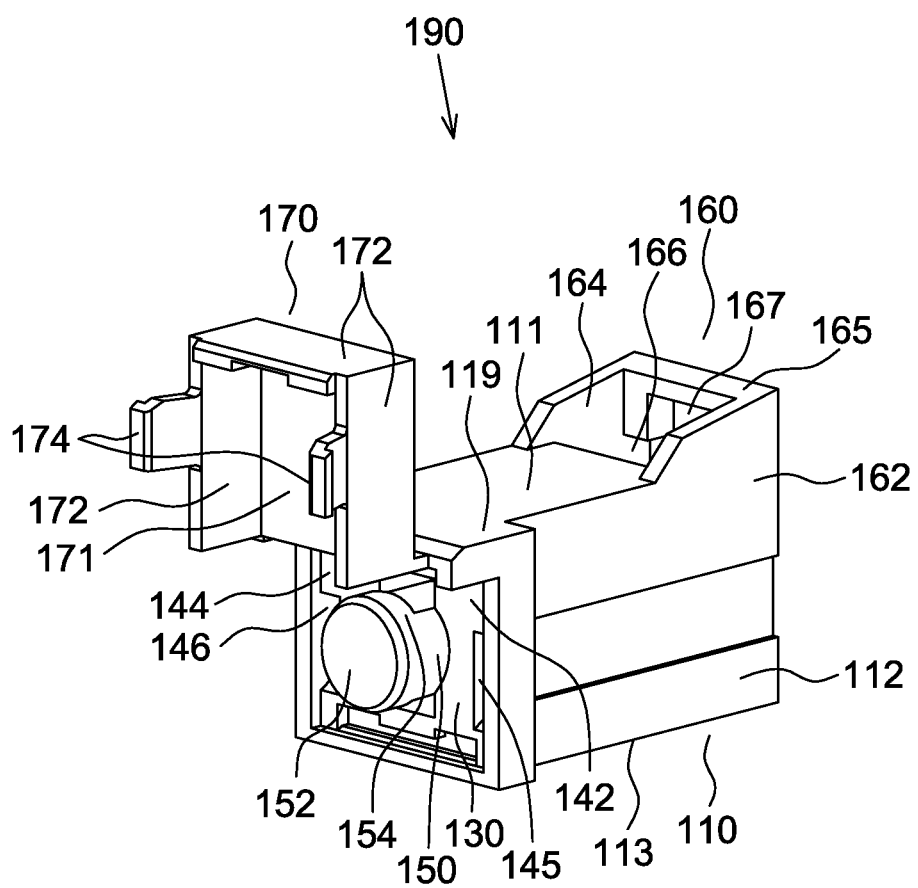
FIGS. 2a to 2d are different elevated perspective views of the dust cap of the dust protector of the first embodiment of the present disclosure.
Figure 2B:
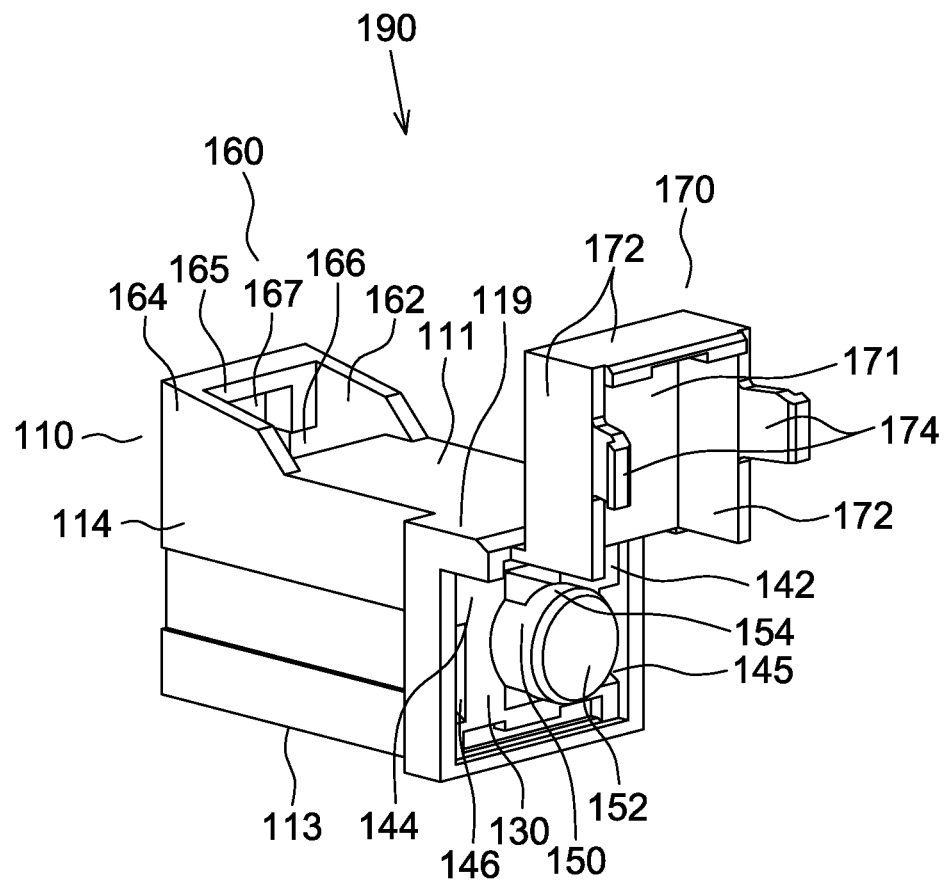
Figure 2C:
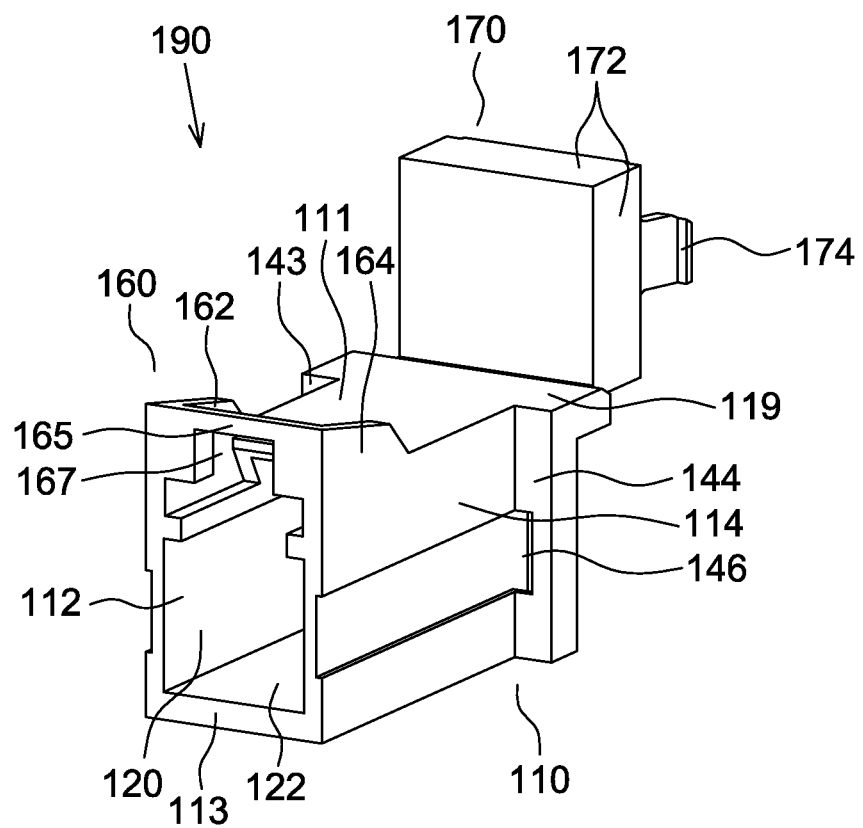
Figure 2D:
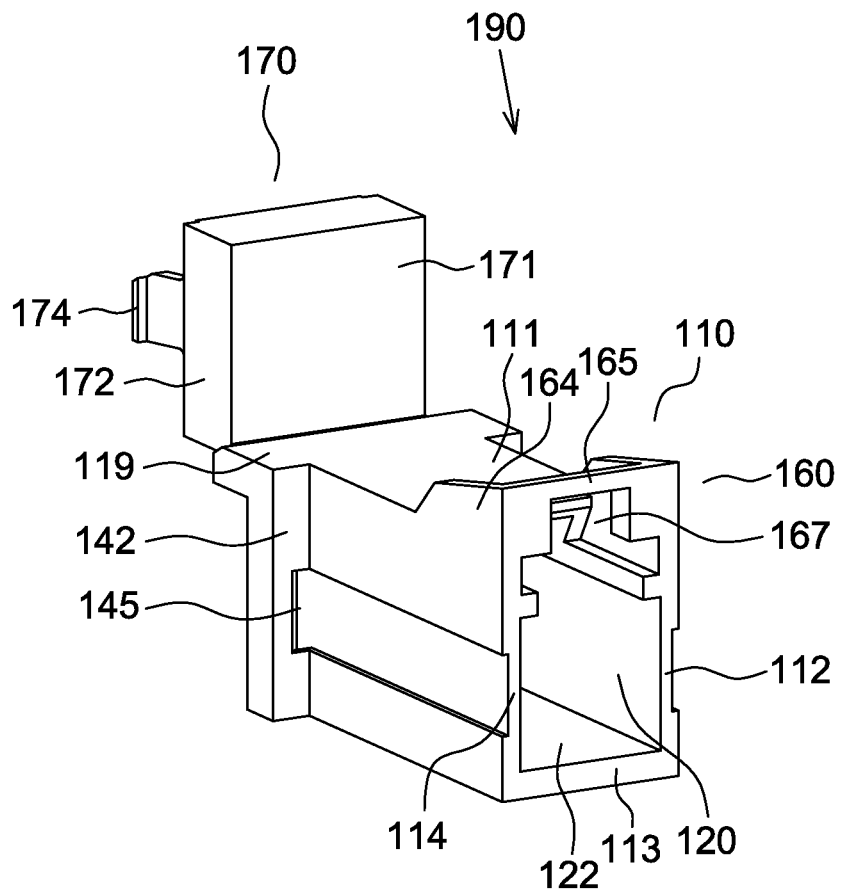

Reference is made to FIG. 1, the dust protector 100 of a fiber optic connector according to the first embodiment of the present disclosure includes a dust cap 190, a retaining ring 180 and a cleaning component 195. Referring to FIGS. 2a to 2d, the dust cap 190 may be constructed of plastics by an injection molding process and has a chamber 120 defined by four connected walls including an upper wall 111, a right wall 112, a lower wall 113 and a left wall 114, wherein the upper wall 111 faces the lower wall 113 and connects with the right wall 112 and the left wall 114. A plate 130 is formed on the front end of the frame 110. The plate 130 is coupled to the walls 111, 112, 113, 114 such that the front end of the frame 110 is substantially closed. The plate 130 extends right and left beyond the right wall 112 and the left wall 114 to form a right flange 142 and a left flange 144, respectively. Engaging portions 145 and 146 are respectively formed on the right flange 142 and the left flange 144. The two engaging portions 145, 146 may be elongated openings extending in a direction perpendicular to the upper wall 111 and the lower wall 113, and parallel to the right wall 112 and the left wall 114. An opening 122 communicating with the chamber 120 is provided at the rear end of the frame 110. An upper extension 119 extends horizontally from the front end of upper wall 111. A fixing portion 160 is formed at the rear end of the frame 110. The fixing portion 160 includes a right supporting wall 162, a left supporting wall 164 and a blocking wall 165. The right supporting wall 162 extends upward from the right wall 112, the top of which is higher than the upper wall 111. The left supporting wall 164 extends upward from the left wall 114, the top of which is higher than the upper wall 111. The right supporting wall 162 is parallel to the left supporting wall 164. The blocking wall 165 is located between and connected perpendicularly to the right supporting wall 162 and the left supporting wall 164. A gap 166 is formed between the blocking wall 165 and the rear end of the upper wall 111. Further, a rectangular notch 167 is formed in the lower portion of the blocking wall 165.

A cylinder 150 is formed on the front surface of the plate 130. The cylinder 150 is substantially cylindrical and has a substantially flat front end face 152. A front portion of the cylinder 150 is formed with a flange 154. The dust cap 190 further includes a cover 170. The cover 170 includes a rectangular top wall 171. One side of the top wall 171 is connected to the upper extension 119, and three side walls 172 extends vertically from the other three sides of the top wall 171 respectively. In addition, two of the three side walls 172 are respectively provided with an engaging portion 174, wherein the two engaging portions 174 may be hooks.

Figure 3:
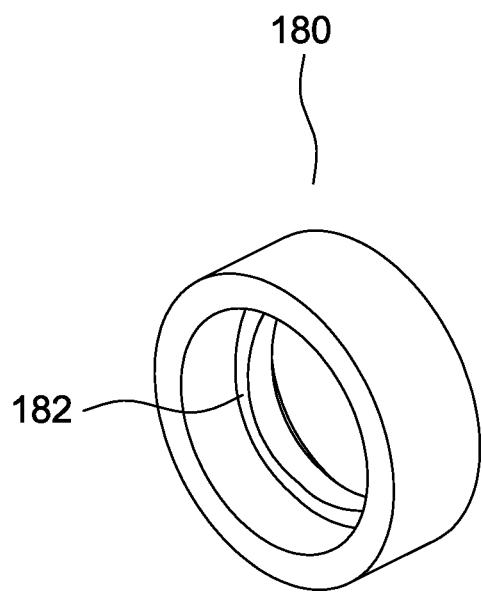
FIG. 3 is an elevated perspective view of the retaining ring of the dust protector of the first embodiment of the present disclosure.
Figure 4A:
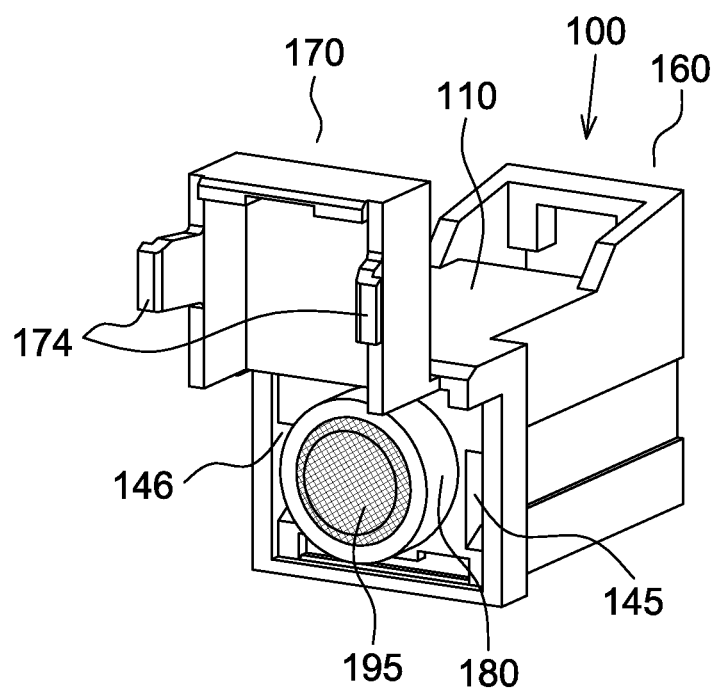
FIG. 4a is an elevated perspective view of the dust protector of the first embodiment of the present disclosure, wherein the cover is open.
Figure 4B:
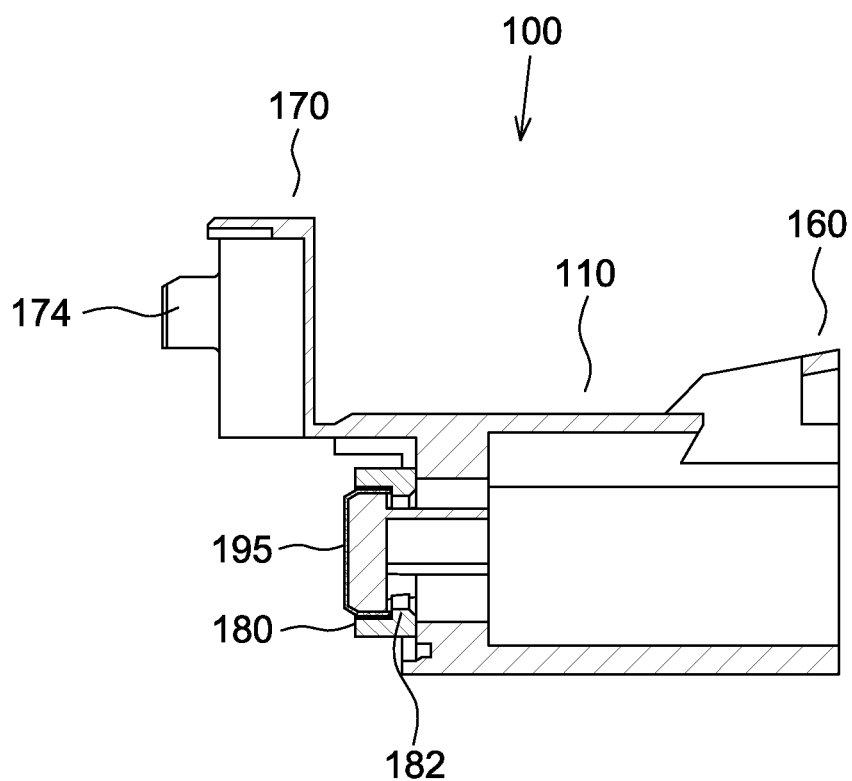
FIG. 4b is a cross-sectional view of the dust protector of the first embodiment of the present disclosure, wherein the cover is open.

Reference is made to FIG. 3, an annular projection 182 is formed on the rear edge of the inner surface of the retaining ring 180. Referring to FIGS. 4a and 4b, the dust protector 100 of the present disclosure is characterized in that the cleaning component 195, such as cleaning wipe or adhesive cloth, is placed on the front end face 152 and lateral surfaces of the cylinder 150. The retaining ring 180 is shaped to be placed over the cylinder 150 and the annular protrusion 182 comes into engagement with the rear end of the flange 154 of the cylinder 150 so that the retaining ring 180 will not fall off the cylinder 150. The retaining ring 180 secures the cleaning component 195 to the cylinder 150 and the cleaning component 195 exposes from the opening of the retaining ring 180.

Figure 5:
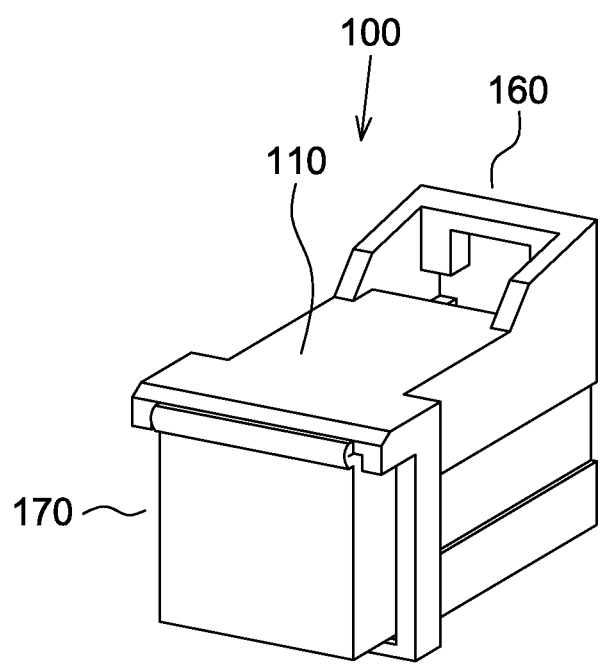
FIG. 5 is an elevated perspective view of the dust protector of the first embodiment of the present disclosure, wherein the cover is closed.

In the dust protector 100 of the present disclosure, the cover 170 connected to the upper extension 119 may be turned toward or away from the frame 110. Referring to FIG. 5, the cover 170 is pressed down such that the engaging portions 174 penetrate into the engaging portions 145 and 146 on the right flange 142 and the left flange 144 respectively. This way the cover 170 covers the cleaning component 195 on the cylinder 150 to protect the cleaning component 195 from contamination.

Figure 6:
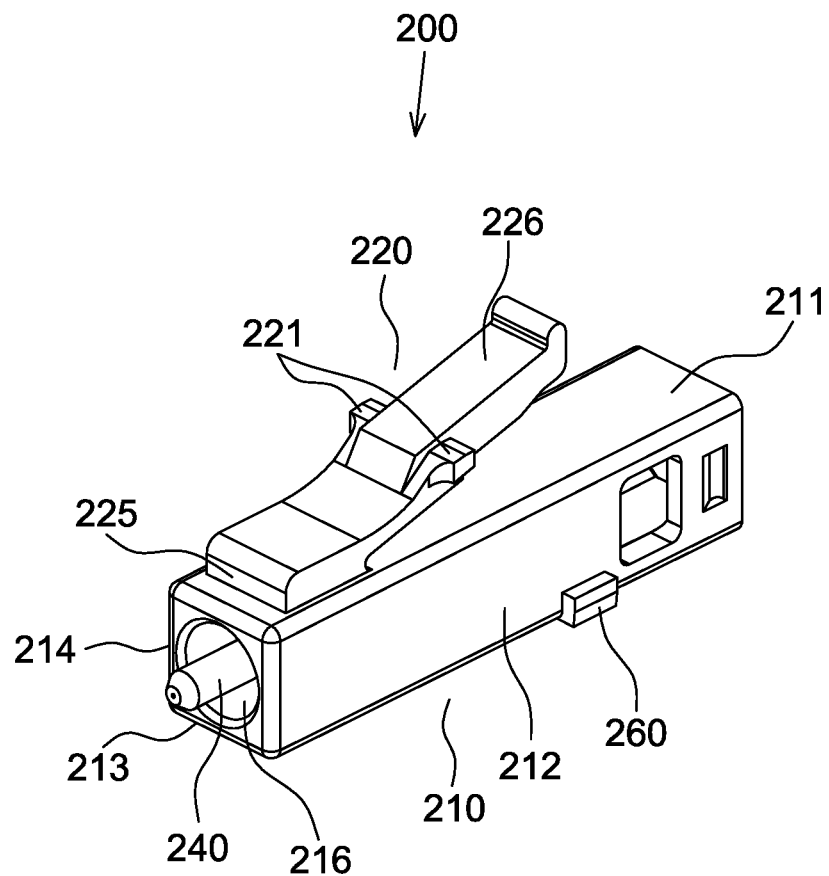
FIG. 6 is an elevated perspective view of a conventional LC type fiber optic connector.

Referring to FIG. 6, a conventional LC fiber optic connector 200 has a generally rectangular shape with a square cross section. The fiber optic connector 200 includes a rectangular hollow housing 210 comprised of an upper wall 211, a lower wall 213, a right wall 212 and a left wall 214, wherein the upper wall 211 faces the lower wall 213 and connects with the right wall 212 and the left wall 214. A latch 220 is molded into the upper wall 211 and includes a living hinge 225 which allows the tab 226 to be moved up and down in a direction perpendicular to the central axis of the fiber optic connector 200. The latch 220 further includes a pair of protrusions 221 that are positioned on opposing sides of the tab 226, respectively. In addition, a ferrule 240 protrudes from a circular opening 216 on the front end of the housing 210. A pair of protrusions 260 is positioned on the right wall 212 and left wall 214, respectively.

Figure 7:
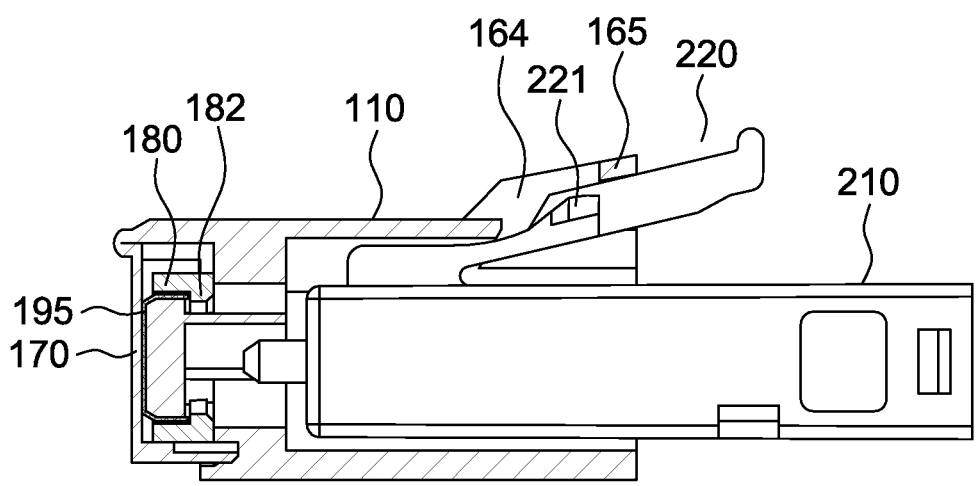
FIG. 7 illustrates that the dust protector of the first embodiment of the present disclosure is placed over the fiber optic connector of FIG. 6.

Referring to FIG. 7, when the dust protector 100 of the present disclosure is used to protect the conventional fiber optic connector 200, the front end of the fiber optic connector 200 is inserted into the frame 110 from the opening 122 and the protrusions 221 on the latch 220 is moved through the notch 167 in the blocking wall 165. At this time the frame 110 of the dust cap 190 covers the ferrule 240 at the front end of the fiber optic connector 200 to protect the ferrule 240 from contamination. The protrusions 221 on the fiber optic connector 200 is used to abut against the blocking wall 165 of the dust cap 190 to prevent the fiber optic connector 200 from being inadvertently pulled out from the frame 110. This may prevent the frame 110 from falling off from the fiber optic connector 200.

When the dust protector 100 of the present disclosure is used to clean the ferrule 240 of the fiber optic connector 200, the dust cap 190 is removed from the fiber optic connector 200. Afterward, the dust cap 190 is rotated 180 degrees and the cover 170 is flipped open to expose the cleaning component 195. The cleaning component 195 is then brought into contact with the ferrule 240 to wipe the dirt and dust on the ferrule 240.

Figure 8:
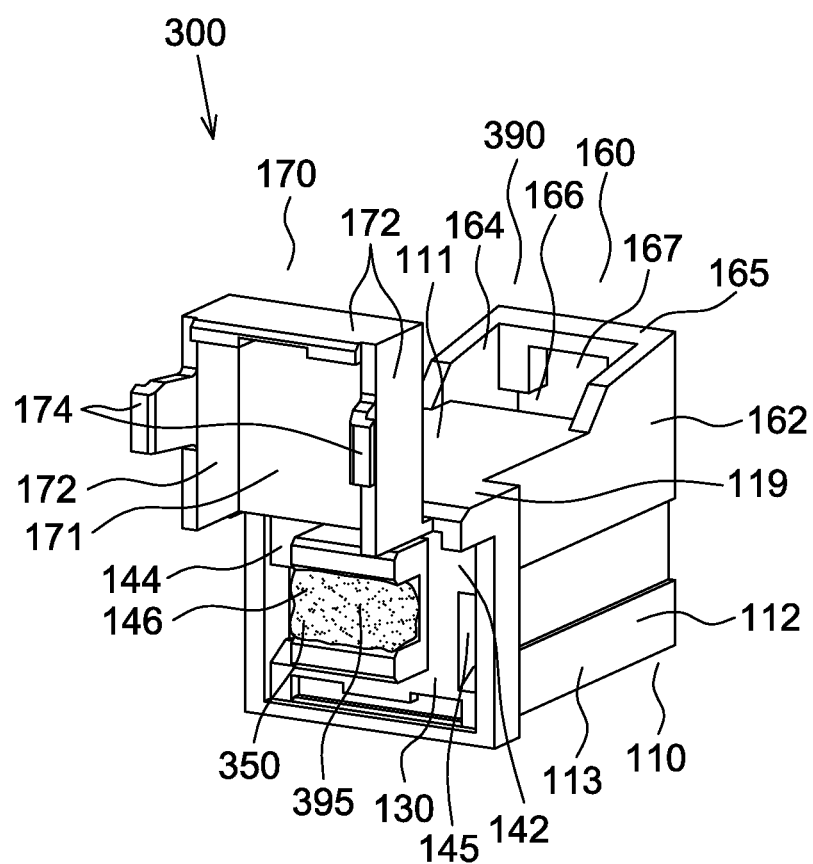
FIG. 8 is an elevated perspective view of the dust protector of the second embodiment of the present disclosure.

Reference is made to FIG. 8, the dust protector 300 of a fiber optic connector according to the second embodiment of the present disclosure includes a dust cap 390 and an adhesive jelly 395. The dust cap 390 of the dust protector 300 in the second embodiment is substantially the same as the dust cap 190 of the dust protector 100 in the first embodiment. In the following figures identical reference numerals will be used when designating substantially identical elements that are common to the figures. Different from the dust cap 190 in the first embodiment, the dust cap 390 in this embodiment is provided with a trough 350 to replace the cylinder 150 of the dust cap 190. The trough 350 is disposed on the front surface of the plate 130 and the adhesive jelly 395 with cleaning function is filled in the trough 350.

Similarly, the fiber optic connector 200 can also be inserted into the frame 110 of the dust cap 390 to protect the fiber optic connector 200 from contamination. The protrusions 221 on the fiber optic connector 200 may also abut against the blocking wall 165 of the dust cap 390 to prevent the frame 110 from falling off from the fiber optic connector 200.

When the dust protector 300 of the present disclosure is used to clean the ferrule 240 of the fiber optic connector 200, the dust cap 390 is removed from the fiber optic connector 200. Afterward, the dust cap 390 is rotated 180 degrees and the cover 170 is flipped open to expose the adhesive jelly 395. The ferrule 240 is then moved to contact the adhesive jelly 395 to remove the dirt and dust thereon.

Figure 9:
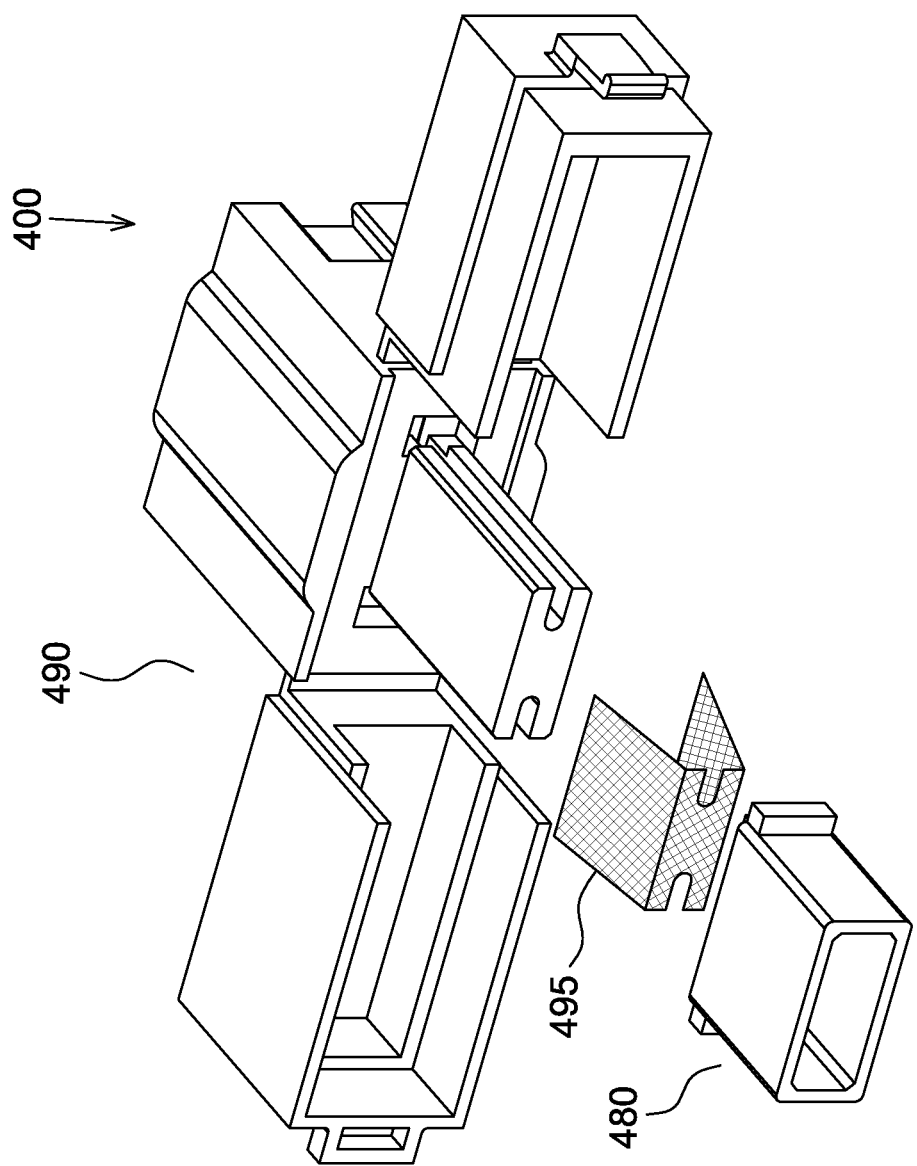
FIG. 9 is an exploded view of the dust protector of a fiber optic connector of the third embodiment of the present disclosure.

Reference is made to FIG. 9, the dust protector 400 of a fiber optic connector according to the third embodiment of the present disclosure includes a dust cap 490, a retaining ring 480 and a cleaning component 495.

Figure 10A:
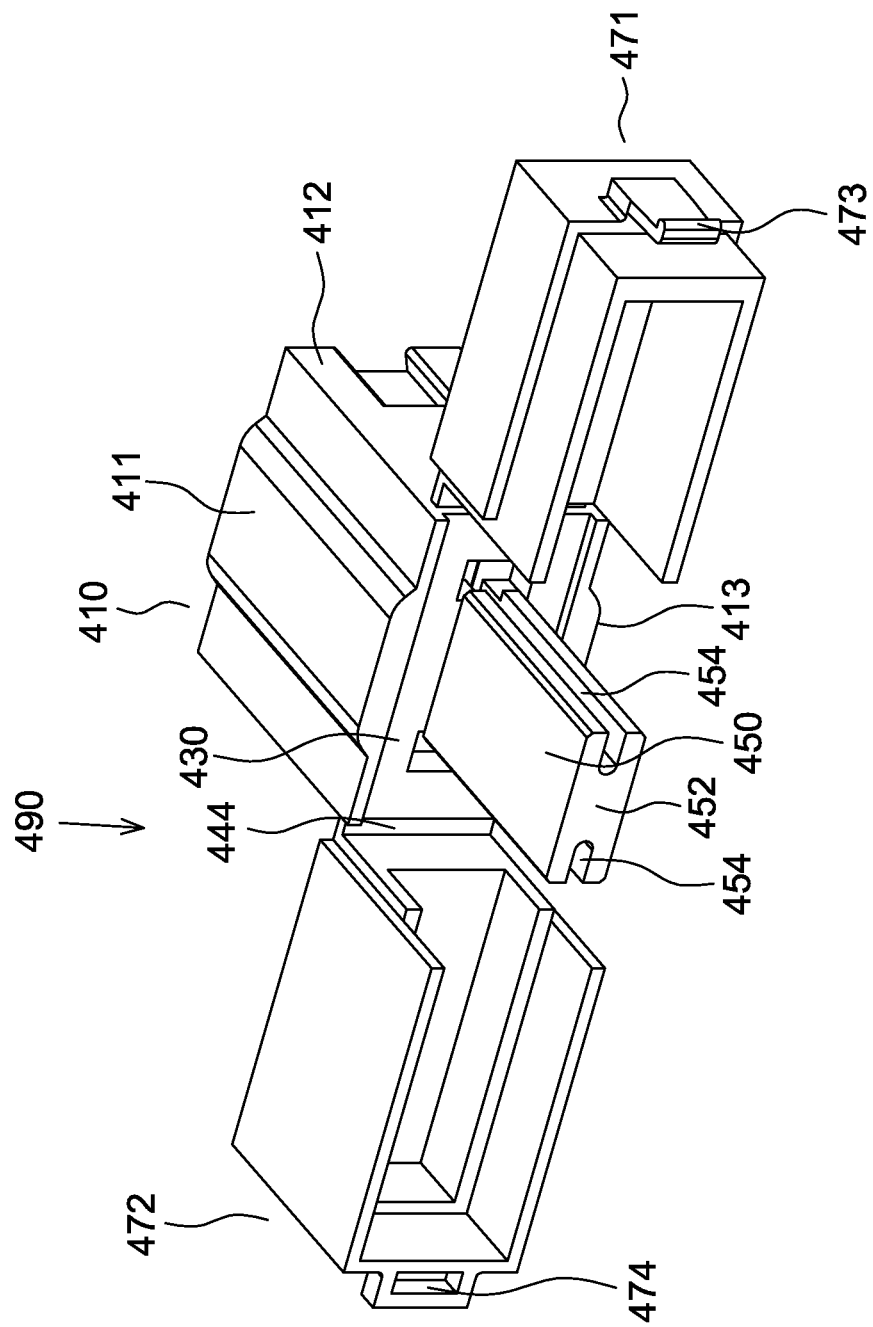
FIGS. 10a to 10c are different elevated perspective views of the dust cap of the dust protector of the third embodiment of the present disclosure.
Figure 10B:
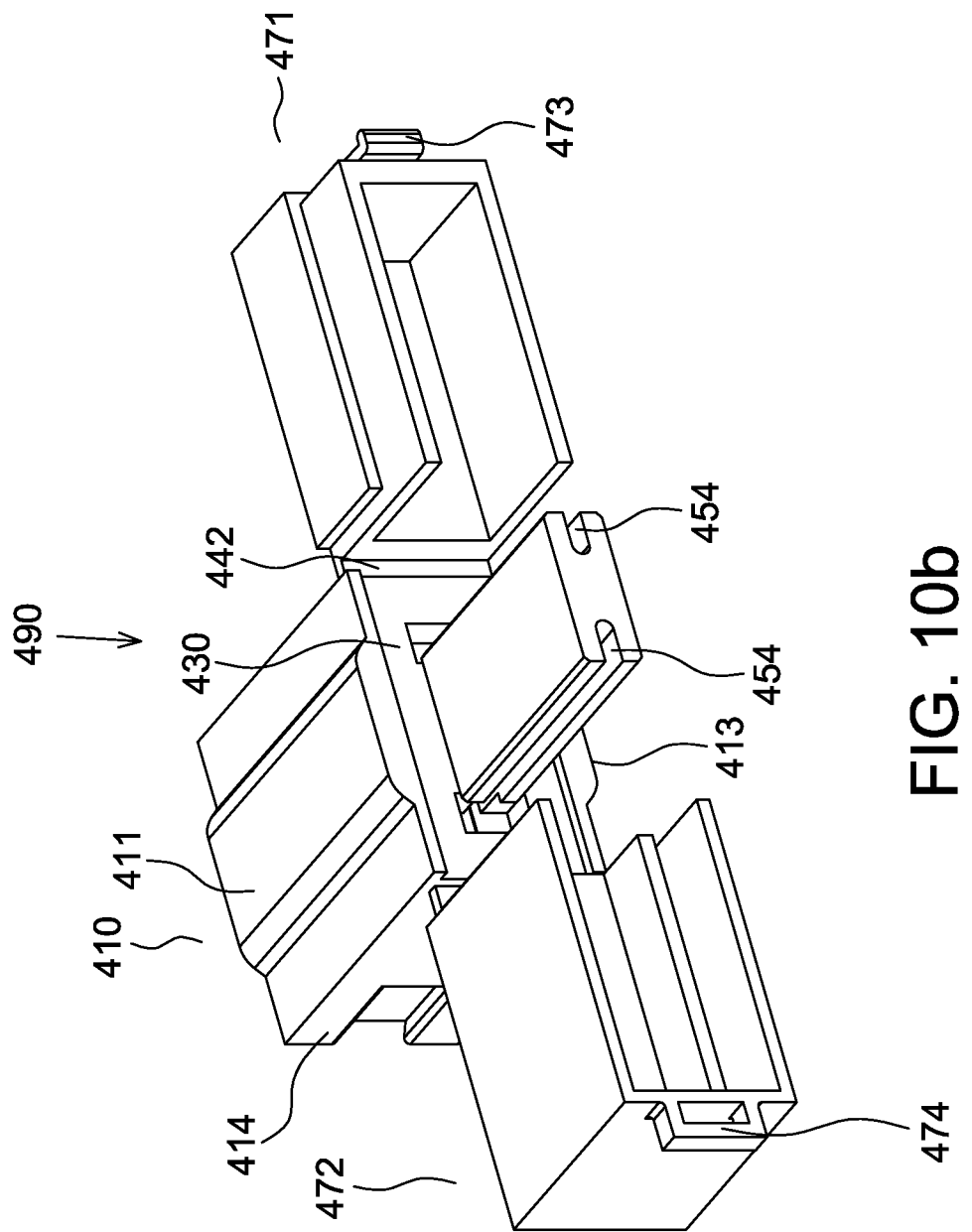
Figure 10C:
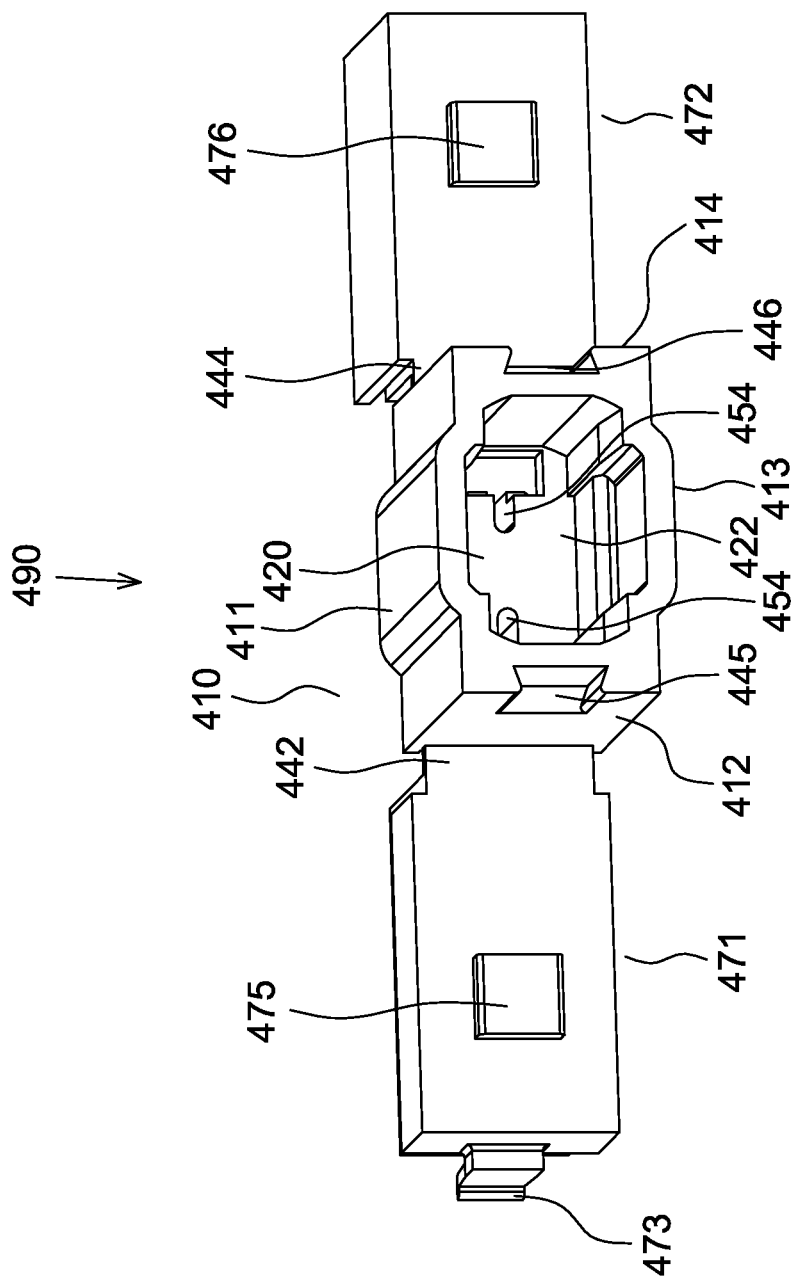

Referring to FIGS. 10a to 10c, the dust cap 490 may be constructed of plastics by an injection molding process and has a chamber 420 defined by four connected walls including an upper wall 411, a right wall 412, a lower wall 413 and a left wall 414, wherein the upper wall 411 faces the lower wall 413 and connects with the right wall 412 and the left wall 414. A plate 430 is formed on the front end of the frame 410. The plate 430 is coupled to the walls 411, 412, 413, 414 such that the front end of the frame 410 is substantially closed. A right flange 442 extends rightward from the right wall 412 and a left flange 444 extends leftward from the left wall 414. An opening 422 communicating with the chamber 420 is provided at the rear end of the frame 410. Engaging portions 445 and 446 are respectively formed on the outer surfaces of the right wall 412 and the left wall 414. In one embodiment, the engaging portions 445, 446 may be dovetail grooves.

An elongated cylinder 450 is formed on the front surface of the plate 430. The cylinder 450 has a substantially rectangular cross section and has a flat front end face 452. A semi-circular recess 454 is formed in each of two opposing sides of the cylinder 450. The two recesses 454 longitudinally extend from the front end face 452 to the plate 430.

The dust cap 490 further includes two covers 471, 472, wherein one side of the cover 471 is coupled to the right flange 442 and one side of the cover 472 is coupled to the left flange 444. Further, the covers 471 and 472 are respectively provided with engaging portions 473 and 474, which are configured to engage with each other. In one embodiment, the engaging portions 473 and 474 are a hook and a buckle, respectively. Engaging portions 475 and 476 are formed on the outer surfaces of the covers 471 and 472, respectively and they may engage with the engaging portions 445 and 446, respectively. In one embodiment, the engaging portions 475, 476 may be protrusions.

Referring back to FIG. 9, the cleaning component 495 may be a piece of cleaning wipe or adhesive cloth. The retaining ring 480 is shaped to be placed over the cylinder 450.

Figure 11A:
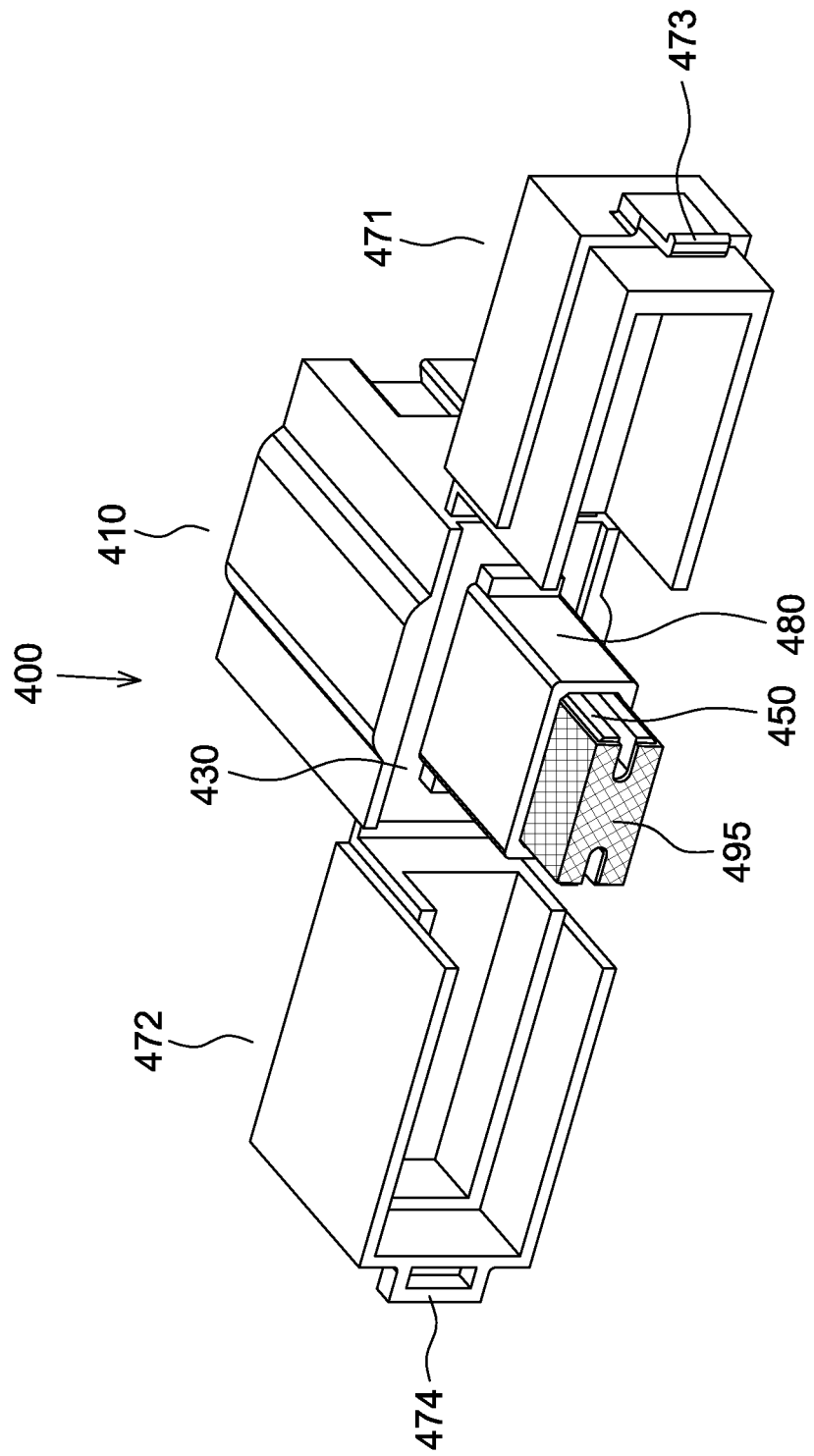
FIG. 11a is an elevated perspective view of the dust protector of the third embodiment of the present disclosure.
Figure 11B:
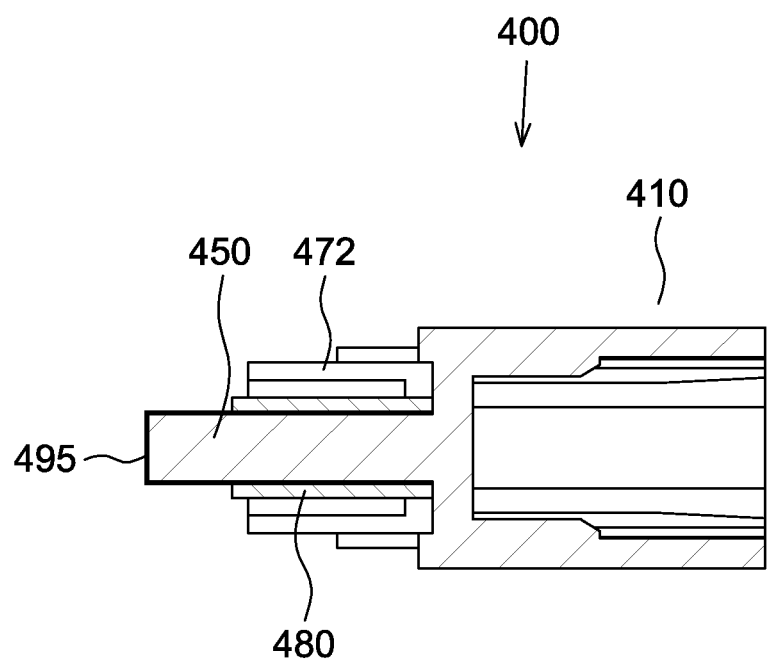
FIG. 11b is a cross-sectional view of the dust protector of the third embodiment of the present disclosure.

Referring to FIGS. 11a and 11b, the dust protector 400 of the present disclosure is characterized in that the cleaning component 495 is placed on the front end face 452 and lateral surfaces of the cylinder 450, but does not cover the recesses 454. The retaining ring 480 is placed over the cylinder 450 such that the retaining ring 480 secures the cleaning component 495 to the cylinder 450. The cleaning component 495 exposes from the retaining ring 480.

Figure 12:
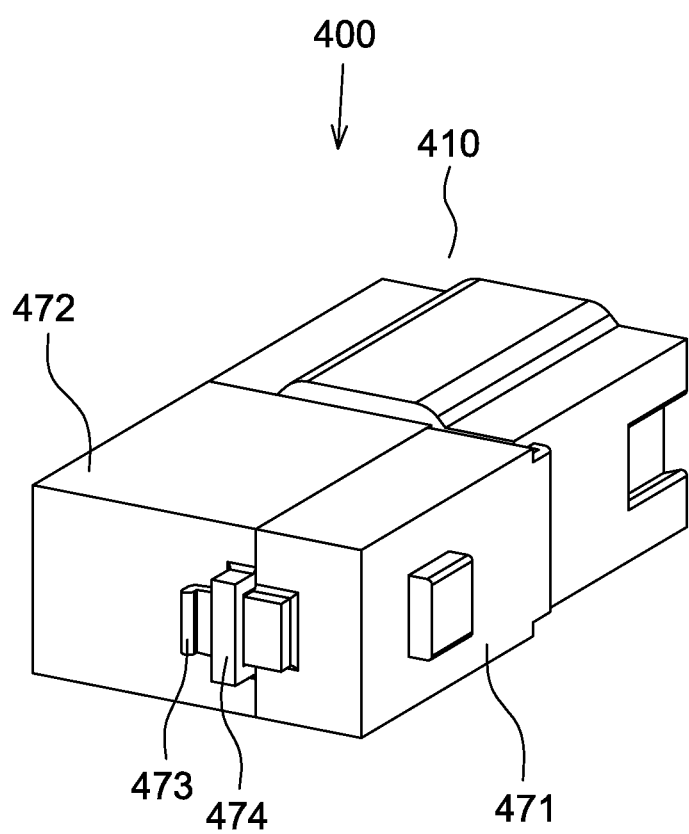
FIG. 12 is an elevated perspective view of the dust protector of the third embodiment of the present disclosure, wherein two covers are coupled together.

In the dust protector 400 of the present disclosure, the covers 471, 472 connected to the frame 410 may be turned toward or away from the frame 410. Referring to FIG. 12, the engaging portions 473 and 474 respectively formed on the covers 471 and 472 are engaged with each other so that the two covers 471, 472 are coupled together to cover the cleaning component 495. This way the cleaning component 495 on the cylinder 450 is protected from contamination. It should be noted that the dust protector 400 may be designed to include only one cover, as shown in the dust protector 100 of the first embodiment, the cleaning component 495 may be protected with only one cover.

Figure 13:
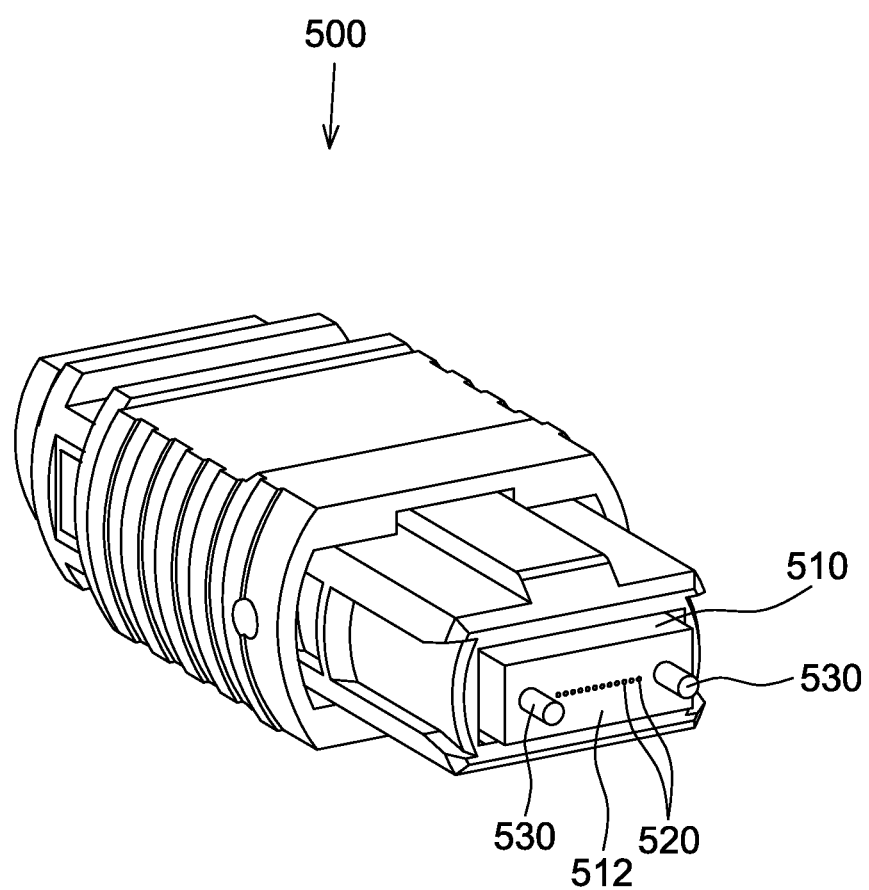
FIG. 13 is an elevated perspective view of a conventional MPO male type fiber optic connector.

FIG. 13, a conventional MPO male type fiber optic connector 500 includes a ferrule 510 and a plurality of optical fibers 520 exposed on the front end face 512 of the ferrule 510. Further, two guide pins 530 extend longitudinally from the front end face 512 of the ferrule 510.

Figure 14:
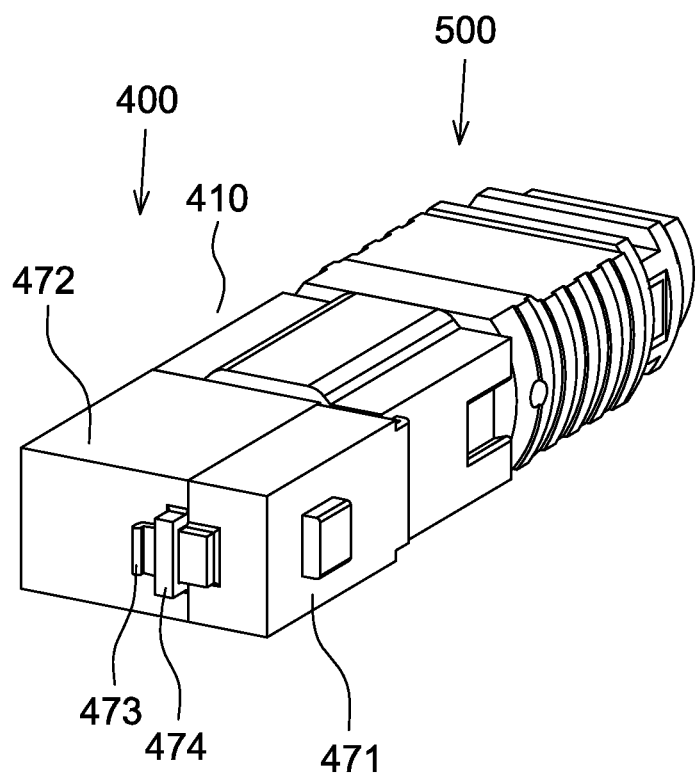
FIG. 14 illustrates that the dust protector of the third embodiment of the present disclosure is placed over the fiber optic connector of FIG. 13.

Referring to FIG. 14, when the dust protector 400 of the present disclosure is used to protect the conventional fiber optic connector 500, the fiber optic connector 500 is inserted into the frame 410 from the opening 422. At this time the frame 410 of the dust cap 490 covers the ferrule 510 of the fiber optic connector 500 to protect the fiber optic connector 500 from contamination.

When the dust protector 400 of the present disclosure is used to clean the ferrule 510 of the fiber optic connector 500, the dust cap 490 is removed from the fiber optic connector 500. Afterward, the dust cap 490 is rotated 180 degrees and the covers 471, 472 are flipped open to expose the cleaning component 495. The two guide pins 530 of the fiber optic connector 500 are respectively placed in the recesses 454 located on the two sides of the cylinder 450 of the dust protector 400 and the ferrule 510 is brought into contact with the cleaning component 495 to remove the dirt and dust on the front end face 512 of the ferrule 510. In order to facilitate holding the dust protector 400 when cleaning an fiber optic connector, the covers 471, 472 may be turned to being close to the right and left walls 412, 414 respectively such that the engaging portions 475, 476 are engaged with the engaging portions 445, 446, respectively.

Figure 15:
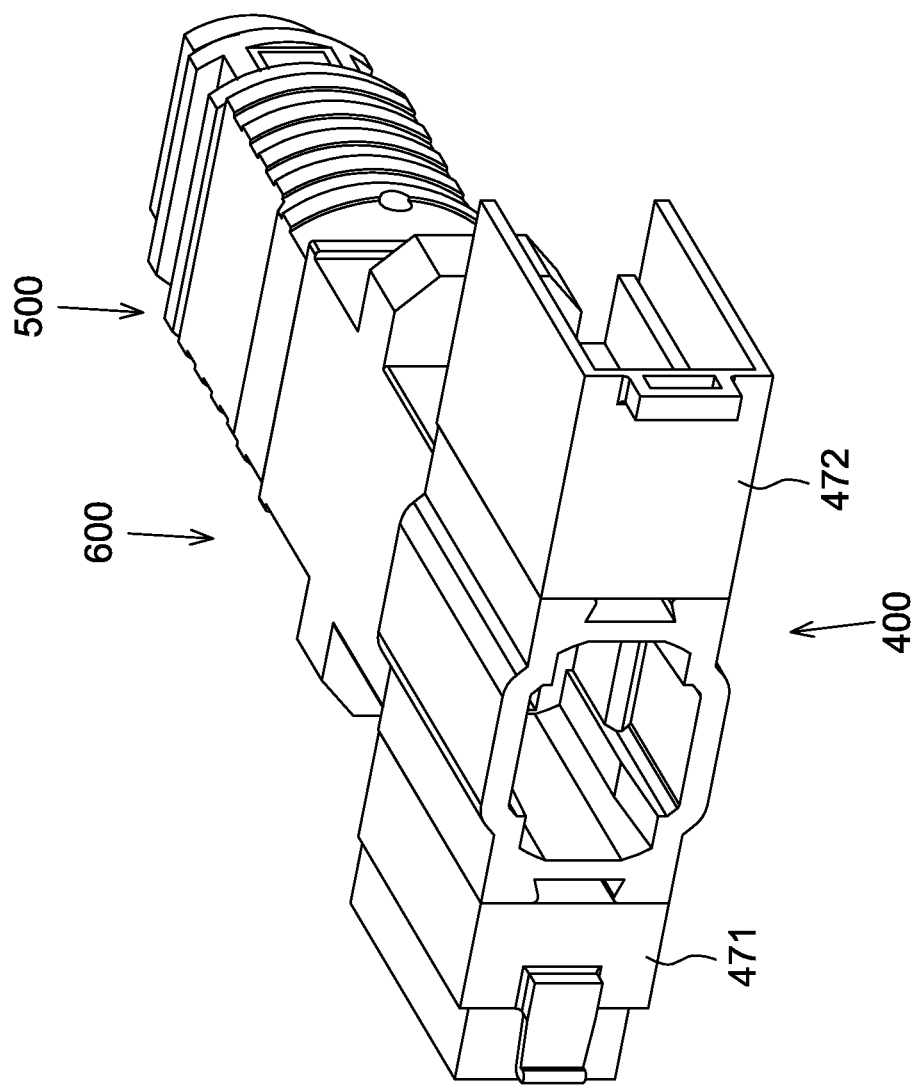
FIG. 15 illustrates that the dust protector of the third embodiment of the present disclosure is used to clean the fiber optic connector mated with a fiber optic adapter.

In addition, the dust protector 400 of the present disclosure may also be used to clean the fiber optic connector 500 that has been mated with a fiber optic adapter. Referring to FIG. 15, the fiber optic connector 500 has been mated with the MPO type fiber optic adapter 600. The dust protector 400 of the present disclosure is inserted from the other end into the fiber optic adapter 600 to bring the cleaning component 495 into contact with the front end face 512 of the ferrule 510 thereby cleaning the ferrule 510. It should be understood that the cylinder 450 of the dust protector 400 needs to be long enough so as to allow the cleaning component 495 on the cylinder 450 to come into contact with the ferrule 510.

Figure 16:
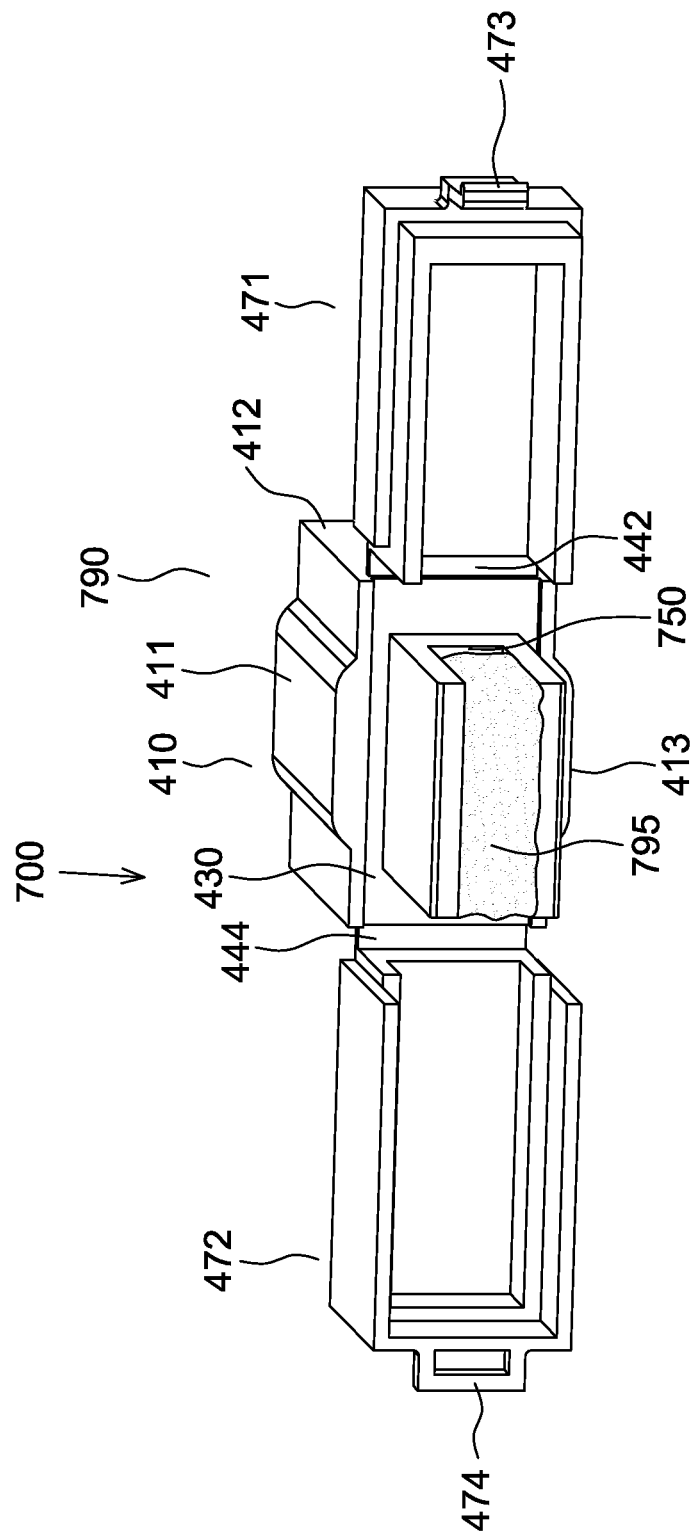
FIG. 16 is an elevated perspective view of the dust protector of the fourth embodiment of the present disclosure.

Reference is made to FIG. 16, the dust protector 700 of a fiber optic connector according to the fourth embodiment of the present disclosure includes a dust cap 790 and an adhesive jelly 795. The dust cap 790 of the dust protector 700 in the fourth embodiment is substantially the same as the dust cap 490 of the dust protector 400 in the third embodiment. In the following figures identical reference numerals will be used when designating substantially identical elements that are common to the figures. Different from the dust cap 490 in the third embodiment, the dust cap 790 in this embodiment is provided with a trough 750 to replace the cylinder 450 of the dust cap 490. The trough 750 is disposed on the front surface of the plate 430 and the adhesive jelly 795 with cleaning function is filled in the trough 750.

When the dust protector 700 of the present disclosure is used to clean the ferrule 510 of the fiber optic connector 500, the dust cap 790 is removed from the fiber optic connector 500. Afterward, the dust cap 790 is rotated 180 degrees and the covers 471, 472 are flipped open to expose the adhesive jelly 795. The ferrule 510 is then moved to contact the adhesive jelly 795 to remove the dirt and dust thereon. Similarly, the trough 750 may also be designed to have an enough height to allow the adhesive jelly 795 filled therein to come into contact with the ferrule 510 of the fiber optic connector 500 that has been mated with the fiber optic adapter 600, thereby cleaning the ferrule 510.

In addition to being used to protect fiber optic connectors from contamination, the dust protectors of the present disclosure provide additional value that avoids the need to use a separate cleaning component to clean the fiber ends of the fiber optic connectors.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A dust protector of a fiber optic connector, comprising:
    a dust cap, comprising
        a frame for covering the fiber optic connector, the frame comprising a front surface and a rear end, wherein the rear end faces the fiber optic connector;
        a cylinder protruding from the front surface of the frame;
        a cover connected to the frame, wherein the cover is configured to flip toward or away from the frame to cover or expose the cylinder; and
        a cleaning component covering the cylinder, wherein the cleaning component is to clean the fiber optic connector;
    wherein the cover, when flipped toward the frame, covers and therefore protects the cleaning component from contamination, and the cover, when flipped away from the frame, opens and exposes the cleaning component so that it can directly contact the fiber optic connector and clean it.

2. The dust protector as claimed in claim 1, further comprising:
    a retaining ring securing the cleaning component to the cylinder.

3. The dust protector as claimed in claim 1, wherein the cleaning component is a cleaning wipe or adhesive cloth.

4. The dust protector as claimed in claim 1, wherein the dust cap further comprises:
    a first engaging portion coupled to the frame; and
    a second engaging portion coupled to the cover, wherein the second engaging portion is to engage with the first engaging portion to prevent the cover from being flipped open.

5. The dust protector as claimed in claim 1, wherein the fiber optic connector comprises a latch and two protrusions formed on the latch, the dust cap further comprising:
    a fixing portion coupled to the frame, wherein the fixing portion is disposed against the protrusions formed on the latch to prevent the fiber optic connector from being pulled out from the frame when the frame covers the fiber optic connector.

6. The dust protector as claimed in claim 1, wherein a recess is formed on each of two opposing sides of the cylinder to accommodate a guide pin disposed on the fiber optic connector.

7. The dust protector as claimed in claim 1, wherein the dust cap is integrally formed.

8. The dust protector as claimed in claim 1, wherein the fiber optic connector is an LC type or MPO type fiber optic connector.

9. A dust protector of a fiber optic connector, comprising:
    a dust cap, comprising
        a frame for covering the fiber optic connector, the frame comprising a front surface and a rear end, wherein the rear end faces the fiber optic connector;
        a cylinder protruding from the front surface of the frame; and
        two covers connected to the frame, wherein the covers are configured to flip toward or away from the frame; and
        a cleaning component covering the cylinder, wherein the cleaning component is to clean the fiber optic connector;
    wherein the covers, when flipped toward the frame, couple together to cover and therefore protect the cleaning component from contamination, and the covers, when flipped away from the frame, open and expose the cleaning component so that it can directly contact the fiber optic connector and clean it.

10. The dust protector as claimed in claim 9, further comprising:
    a retaining ring securing the cleaning component to the cylinder.

11. The dust protector as claimed in claim 9, wherein the cleaning component is a cleaning wipe or adhesive cloth.

12. The dust protector as claimed in claim 9, wherein a recess is formed on each of two opposing sides of the cylinder to accommodate a guide pin disposed on the fiber optic connector.

13. The dust protector as claimed in claim 9, wherein the dust cap is integrally formed.

14. A dust protector of a fiber optic connector, comprising:
    a dust cap, comprising
        a frame for covering the fiber optic connector, the frame comprising a front surface and a rear end, wherein the rear end faces the fiber optic connector;
        a trough disposed on the front surface of the frame; and
        a cover connected to the frame, wherein the cover is configured to flip toward or away from the frame; and a jelly adhesive filled in the trough, wherein the jelly adhesive is for cleaning the fiber optic connector;

wherein the cover is closed to protect the jelly adhesive from contamination, and the cover is flipped open to expose the jelly adhesive for directly contacting with the fiber optic connector.

15. The dust protector as claimed in claim 14, wherein the dust cap further comprises:
a first engaging portion coupled to the frame; and
a second engaging portion coupled to the cover, wherein the second engaging portion is to engage with the first engaging portion to prevent the cover from being flipped open.

16. The dust protector as claimed in claim 14, wherein the fiber optic connector comprises a latch and two protrusions formed on the latch, the dust cap further comprising:
a fixing portion coupled to the frame, wherein the fixing portion is disposed against the two protrusions formed on the latch to prevent the fiber optic connector from being pulled out from the frame when the frame covers the fiber optic connector.

17. The dust protector as claimed in claim 14, wherein the dust cap is integrally formed.

18. The dust protector as claimed in claim 14, wherein the fiber optic connector is an LC type or MPO type fiber optic connector.

* * * * *